United States Patent [19]

Kugai et al.

[11] Patent Number: 5,130,514

[45] Date of Patent: Jul. 14, 1992

[54] CONTROL APPARATUS FOR TRACING A WELD LINE IN A WELDING APPARATUS AND CONTROL METHOD THEREFOR

[75] Inventors: Katsuya Kugai, Osaka; Hideyuki Yamamoto, Kobe; Yuusuke Niimura, Osaka, all of Japan

[73] Assignee: Daihen Corporation, Japan

[21] Appl. No.: 520,711

[22] Filed: May 8, 1990

[30] Foreign Application Priority Data

May 10, 1989 [JP] Japan .................................. 1-118176
Nov. 2, 1989 [JP] Japan .................................. 1-286845

[51] Int. Cl.$^5$ ............................................. B23K 9/127
[52] U.S. Cl. ............................. 219/124.34; 219/125.12
[58] Field of Search ....................... 219/125.12, 124.22, 219/124.34

[56] References Cited

U.S. PATENT DOCUMENTS 4,417,126 11/1983 Kasahara et al. .
4,485,291 11/1984 Nomura et al. .
4,857,700 8/1989 Toyoda et al. .................. 219/124.22

FOREIGN PATENT DOCUMENTS 57-160578 10/1982 Japan .
57-160579 10/1982 Japan .
60-223666 11/1985 Japan .
60-234774 11/1985 Japan .
62-230476 10/1987 Japan .

Primary Examiner—Clifford C. Shaw
Attorney, Agent, or Firm—Scully, Scott, Murphy & Presser

[57] ABSTRACT

There is disclosed a control apparatus and a control method in a welding apparatus for enabling a welding torch to trace a weld line with use of an oscillating process. In the control apparatus and control method, the welding torch is oscillated in the left and right directions crossing the weld line with an overpass, and an electric signal is detected responsive to changes in an arc length and a wire extension. The moving average value of the electric signal is calculated for a predetermined smoothing time interval so as to eliminate a high frequency noise component of the electric signal, and there is outputted a low-pass-filtered electric signal having a level of the calculated moving average value. Thereafter, a controller moves the center of the oscillation so as to enable the welding torch to trace the weld line responsive to the filtered electric signal.

17 Claims, 10 Drawing Sheets $R_8 = \Sigma Rr - \Sigma R\ell$ $L_8 = \Sigma L\ell - \Sigma Lr$

5,130,514

CONTROL APPARATUS FOR TRACING A WELD LINE IN A WELDING APPARATUS AND CONTROL METHOD THEREFOR

BACKGROUND OF THE INVENTION

1. Field of the Invention

The present invention relates to a control apparatus for tracing a weld line in a welding apparatus and a control method therefor, more particularly, to a control apparatus for enabling a welding torch to trace a weld line while oscillating the welding torch by detecting an electric signal responsive to changes in an arc length and a wire extension, and a control method therefor.

2. Description of Related Art

Conventionally, there has been widely used a control method for enabling a welding torch to trace a welding line according to a detection signal of an arc sensor for detecting an electric change responsive to changes in the arc length and the wire extension caused when the welding torch is oscillated.

The principle of control methods for tracing the weld line using the arc sensor which have been used in the conventional arc welding methods is applicable to the spray arc down welding method for works of a relative thick plate having a thickness larger than 2.0 mms.

The conventional arc sensor of this type has been developed on basis of the aforementioned principle, and can yield relatively good results in the horizontal fillet welding provided that the welding speed is relatively low, for instance, of an order of 120 cms/min. Also, in the horizontal fillet welding, the arc sensor is applicable to a thin plate of an order of 2.0 mms in thickness.

However, in the case of a thin plate welding for various kinds of parts of automobiles or a vertical down welding for various kinds of works, there has been widely used the short arc welding method utilizing a short circuit phenomenon for welding works in a higher welding speed with a shorter arc length in order to limit the heat input. Further, there has been widely used the MAG pulse arc welding method for welding works with a shorter arc length by sometimes producing a short circuit in order to prevent from producing the spatter in the welding utilizing the above short arc welding method.

However, the conventional arc sensor is applicable to control methods for tracing a weld line by detecting a change in the welding current due to a change in the extension length of the end of the wire and performing various kinds of calculations under the condition of an approximately constant of the arc length upon producing the arc in a welding utilizing the spray arc welding method as described above.

On the other hand, the conventional arc sensor is not applicable to the above short arc welding method for limiting the heat input and the MAG pulse arc welding method since the welding current due to the short circuit changes considerably because of the shorter arc length.

In the conventional arc welding, when there changes the thickness and the material of the works to be welded and the welding position, it is necessary to change the welding current, the welding voltage and to alter the kind of the shielding gas so as to change the arc length and the amount of the heat input, and also it is necessary to select the best welding method among the spray arc welding method, the MAG pulse arc welding method wherein the short circuit phenomenon occurs relatively rarely, and the short arc welding method wherein the short circuit phenomenon often occurs. Recently, one robot is used in order to enlarge the application range, namely, to apply to various kinds of welding method, particularly the short arc welding method.

However, when the conventional arc sensor control method is applied to the short arc welding method, it is very difficult to set a suitable frequency for detecting the arc current as follows:

In an arc phenomenon produced in the short arc welding method wherein the productions of the arc and the short circuit are repeated alternately, the continuous time interval of the short circuit phenomenon is relatively short such as several msec., and the frequency thereof is several hundreds Hz. On the other hand, the frequency of the change in the welding current to be detected by the arc sensor is about 20 Hz even though a higher oscillation frequency is set. Therefore, in the conventional method, after the detected analogue welding current is passed through an analogue low pass filter having a cut-off frequency of about 50 Hz, the analogue signal having passed therethrough is sampled at a sampling frequency in the range from 200 Hz to 500 Hz, and then, an electric signal having a frequency of about 20 Hz is outputted as a control signal for tracing a weld line.

In this conventional method, the analogue signal having passed through the analogue low pass filter has a phase delayed by a phase of about 30° from a welding torch position signal, and it is extremely difficult to compensate an error due to the above phase delay including the dispersion of characteristics of the above filter highly precisely by changing the phase delay depending on changes in the processing conditions of various kinds of short arc welding. Accordingly, the conventional arc sensor control method can not be applied to the short arc welding method.

Namely, it is necessary to set a suitable oscillation frequency in the range from 0.5 Hz to 10 Hz depending on respective welding conditions such as the thickness of plates to be welded. However, it is extremely difficult to compensate the error due to the above phase delay highly precisely by setting a suitable oscillation frequency when respective welding conditions are changed widely.

Therefore, in the control method for tracing the weld line utilizing the conventional arc sensor which is applicable to only the above-mentioned short arc welding method, there is such a problem that it is extremely difficult to more widely set the welding conditions for the same welding apparatus.

SUMMARY OF THE INVENTION

An essential object of the present invention is to provide a control apparatus and a control method for enabling a welding torch to trace a weld line while oscillating the welding torch in a welding apparatus, which is capable of welding works at a higher welding frequency so as to be applicable to the thin plate welding or the vertical down welding in order to limit the heat input.

Another object of the present invention is to provide a control apparatus and a control method for enabling a welding torch to trace a weld line in a welding apparatus, which is applicable to various kinds of welding methods such as the short arc welding method and the MAG pulse arc welding method having a relative short arc length, in addition to the conventional spray arc welding method.

In order to accomplish the above objects, according to one aspect of the present invention, there is provided a control apparatus for enabling a welding torch to trace a weld line in a welding apparatus while oscillating said welding torch in the left and right directions crossing said weld line with an overpass comprising:

detection means for detecting an electric signal responsive to changes in an arc length and a wire extension;

calculation means for calculating a moving average value of said electric signal for a predetermined smoothing time interval so as to eliminate a high frequency noise component of said electric signal;

signal output means for outputting a low-pass-filtered electric signal having a level of said calculated moving average value; and control means for moving the center of said oscillation so as to enable said welding torch to trace said weld line responsive to said filtered electric signal.

According to another aspect of the present invention, there is provided a control method for enabling a welding torch to trace a weld line in a welding apparatus while oscillating said welding torch in the left and right directions crossing said weld line with an overpass comprising:

a detection step of detecting an electric signal responsive to changes in an arc length and a wire extension;

a calculation step of calculating a moving average value of said electric signal for a predetermined smoothing time interval so as to eliminate a high frequency noise component of said electric signal;

an outputting step of outputting a low-pass-filtered electric signal having a level of said calculated moving average value; and a control step of moving the center of said oscillation so as to enable said welding torch to trace said weld line responsive to said filtered electric signal.

BRIEF DESCRIPTION OF THE DRAWINGS

These and other objects and features of the present invention will become clear from the following description taken in conjunction with the preferred embodiments thereof with reference to the accompanying drawings, in which:

FIG. 2b is a chart showing a waveform of a signal outputted from a position detecting circuit 11 shown in FIG. 2a;

FIG. 2c is a chart showing a waveform of a signal outputted from a filter 12 shown in FIG. 2a;

FIG. 2d is a chart showing a waveform of a waveform signal outputted from a waveform composing circuit 13 shown in FIG. 2a;

FIG. 2e is a chart showing a waveform of a first comparative signal outputted from an arithmetic circuit 14 shown in FIG. 2a;

FIG. 2f is a chart showing a waveform of a second comparative signal outputted from an arithmetic circuit 15 shown in FIG. 2a;

FIGS. 3a and 3b are flowcharts showing a sampling action in the arc welding apparatus shown in FIG. 1 and 2a;

FIGS. 6a to 6d are waveform charts showing a process of an action of the high pass filter 19 shown in FIG. 2a;

FIG. 8 is a waveform chart showing a waveform of a waveform signal $S_{13}$ outputted from the waveform composing circuit 13 shown in FIG. 2a;

FIGS. 9a to 9c are waveform charts showing an action of the arithmetic circuit 14 shown in FIG. 2a;

FIGS. 10a to 10c are waveform charts showing an action of the arithmetic circuit 15 shown in FIG. 2a;

DETAILED DESCRIPTION OF THE PREFERRED EMBODIMENTS

Figure 1:
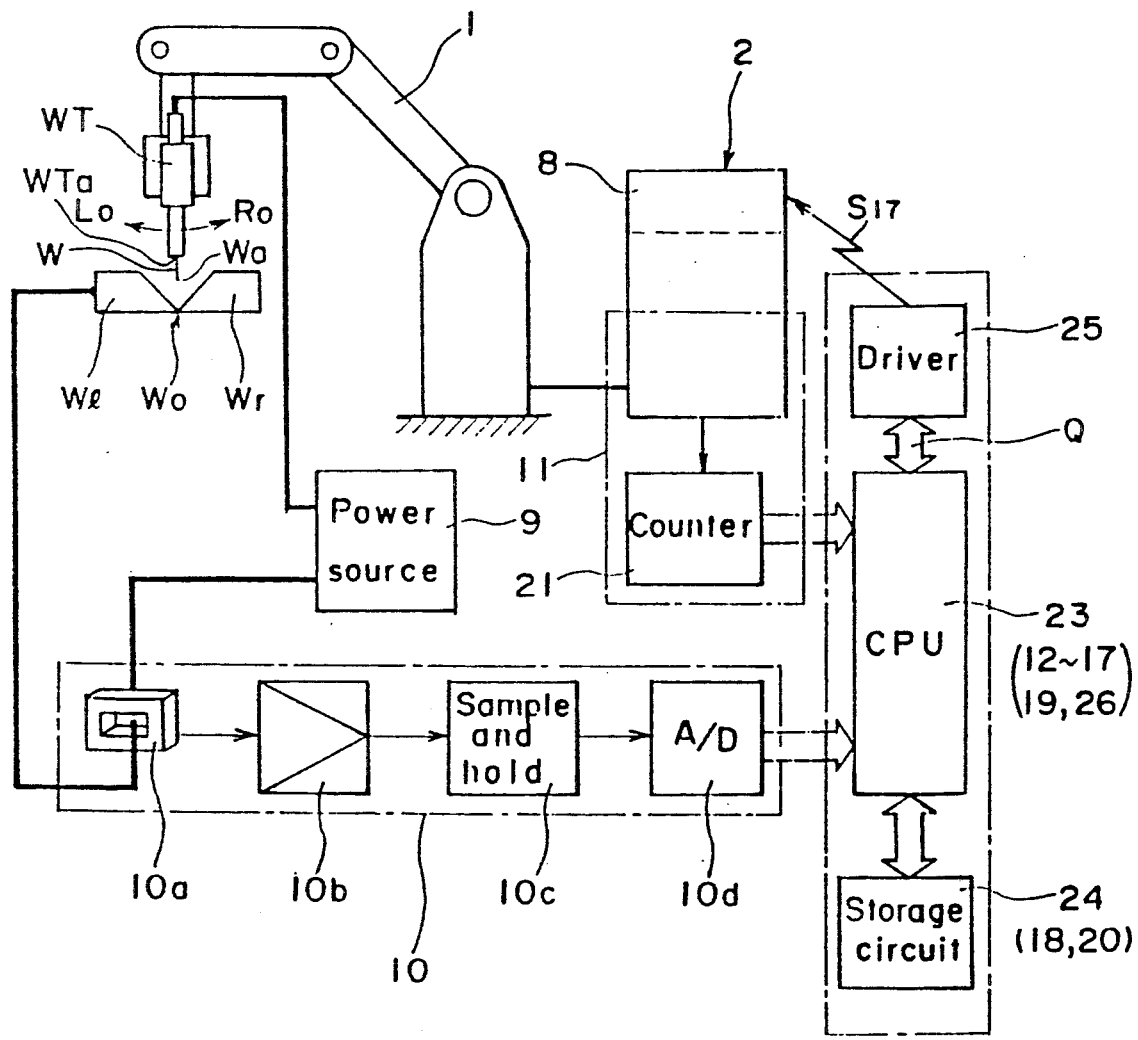
FIG. 1 is a schematic block diagram showing an arc welding apparatus utilizing a control apparatus of the preferred embodiments according to the present invention.

Preferred embodiments according to the present invention will be described below in the order of the following items with reference to the attached drawings.

(1) Composition of Arc welding apparatus
(2) Sampling action of the arc welding apparatus
(3) Action of filters
(4) Calculation of a position correction signal
(5) Effect of preferred embodiments

(1) Composition of Arc welding apparatus

FIG. 1 is a schematic diagram showing an arc welding apparatus utilizing the control method of the present preferred embodiments according to the present invention.

Figure 2A:
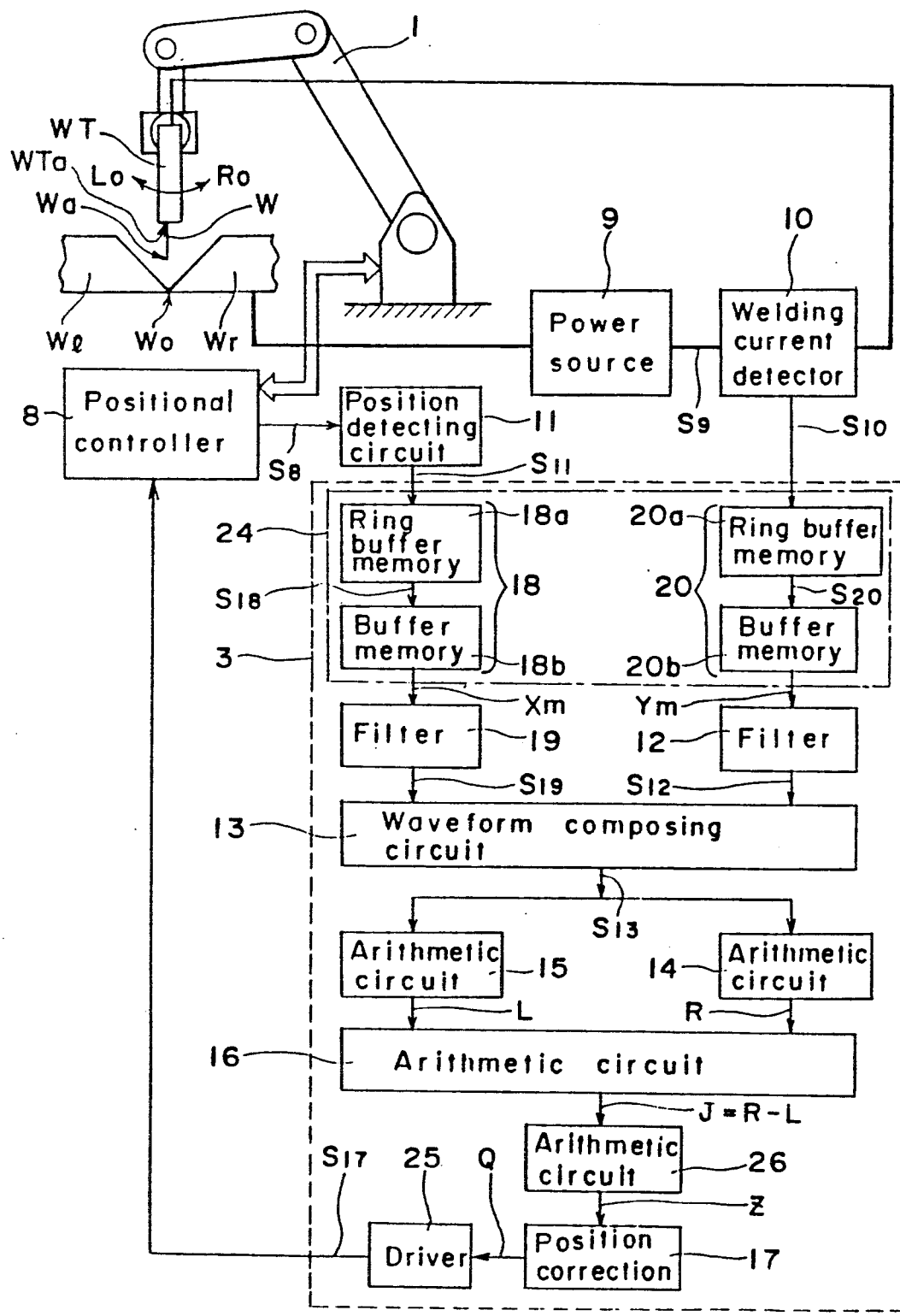
FIG. 2a is a detailed schematic block diagram showing a part of the arc welding apparatus shown in FIG. 1.

FIG. 2a is a detailed schematic block diagram of a part of the arc welding apparatus shown in FIG. 1.

Figure 2B:
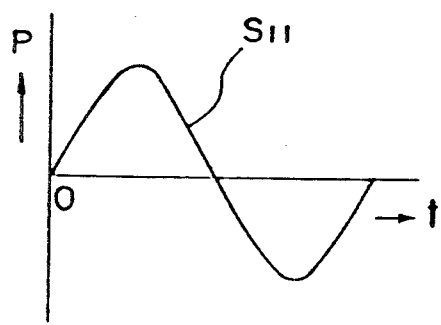
Figure 2C:
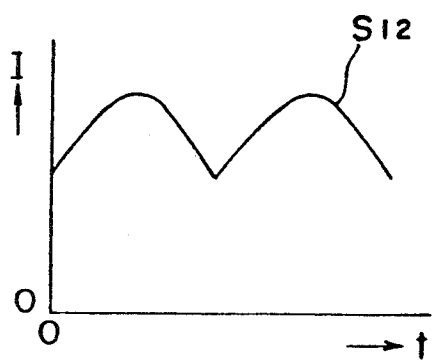

Referring to FIG. 2a, the welding torch WT is mounted on a wrist of a welding robot 1, and a consumable electrode W having a wire end Wa is mounted at the end portion of the welding torch WT. There are provided a left work Wl and a right work Wr so that they face each other along the weld line $W_0$. A welding power source 9 is connected through a welding current detector 10 between the welding torch WT and the works Wl and Wr, and the welding current detector 10 detects a welding current $S_9$ and outputs a signal $S_{10}$ thereof. There is provided a positional controller 8 for controlling the welding robot 1 so as to enable the welding torch WT to trace the weld line $W_0$ and oscillate the welding torch WT in directions crossing the weld line $W_0$ with an overpass as indicated by arrows $L_0$ and $R_0$. Furthermore, the positional controller 8 outputs a pulse signal $S_8$ indicating the position of the welding torch WT, responsive to a positional signal outputted from a positional detector (not shown) for detecting the position of the welding torch WT. A position detecting circuit 11 outputs an oscillation position detecting signal $S_{11}$ shown in FIG. 2b, responsive to the pulse signal $S_8$.

Figure 4A:
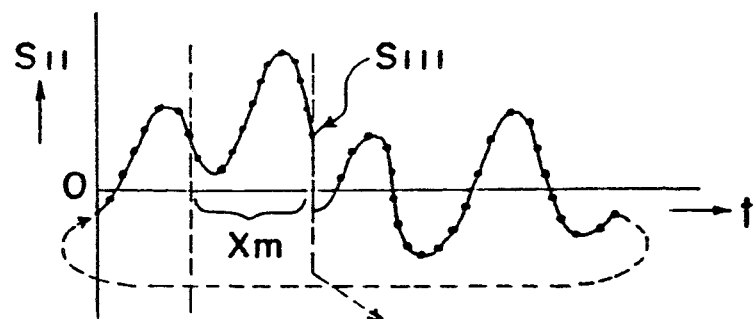
FIG. 4a is a waveform chart showing the relation between a series of signal $S_{11}$ to be stored in a ring buffer memory 18a shown in FIG. 2a and an elapsed time t.

A storage circuit 18 is composed of a ring buffer memory 18a and a buffer memory 18b. The ring buffer memory 18a stores a series of oscillation position detecting signal $S_{11}$ shown in (A) of FIG. 4 which is outputted from the position detecting circuit 11. A series of oscillation position detecting signal (referred to as data Xm hereinafter) for one or plural N periods of the oscillation such as one period before the latest oscillation position detecting signal $S_{11}$ indicated by a ring buffer pointer is read out from the ring buffer memory 18a and is stored in the buffer memory 18b, as shown in (B) of FIG. 4. The data Xm are read out from the buffer memory 18b and are input to a high pass filter 19. The high pass filter 19 eliminates a low frequency noise component included in the signal $S_{18}$ of the data Xm and the drift thereof, and outputs a series of filtered signal $S_{19}$ (referred to as data X hereinafter) having a high frequency signal component shown in (C) of FIG. 4.

A storage circuit 20 is composed of a ring buffer memory 20a and a buffer memory 20b. The ring buffer memory 20a stores a series of welding current detecting signal $S_{10}$ shown in (A) of FIG. 5 which is outputted from the welding current detector 10. A series of welding current detecting signal (referred to as data Ym hereinafter) for one or plural N periods of the oscillation such as one period before the latest welding current detecting signal $S_{10}$ indicated by a ring buffer pointer is reed out from the ring buffer memory 20a and is stored in the buffer memory 20b, as shown in (B) of FIG. 5. The data Ym are read out from the buffer memory 20b and are input to a low pass filter 12. The low pass filter 12 eliminates a high frequency noise component included in the signal $S_{20}$ of the data Ym and outputs a series of filtered signal $S_{12}$ (referred to as data Y hereinafter) having a low frequency signal component shown in (C) of FIG. 5.

Figure 2D:
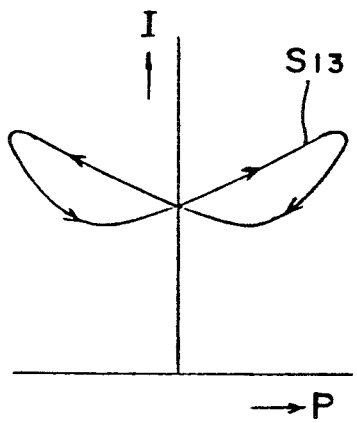

A waveform composing circuit 13 outputs a waveform signal $S_{13}$ shown in FIG. 2d indicating a change in the welding current I to the position P of the oscillating welding torch WT, responsive to the filtered signals $S_{19}$ and $S_{12}$.

Figure 2E:
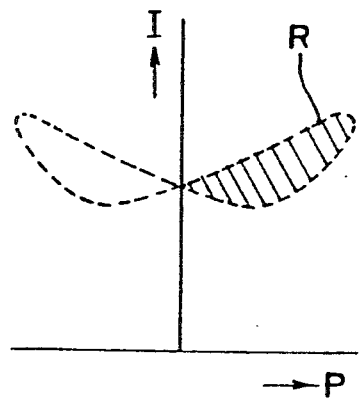
Figure 2F:
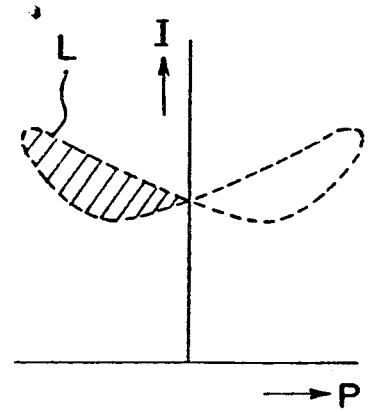

An arithmetic circuit 14 compares the first welding current detecting signal generated when the welding torch WT moves in the right direction for a first time interval of the right half of the amplitude of the oscillation, with the second welding current detecting signal generated when the welding torch WT moves in the left direction for the first time interval, and outputs the first comparative signal R shown in FIG. 2e, responsive to the waveform signal $S_{13}$, as described in detail later. An arithmetic circuit 15 compares the third welding current detecting signal generated when the welding torch WT moves in the left direction for a second time interval of the left half of the amplitude of the oscillation, with the fourth welding current detecting signal generated when the welding torch WT moves in the right direction for the second time interval, and outputs the second comparative signal L shown in FIG. 2f, responsive to the waveform signal $S_{13}$, as described in detail later.

Furthermore, an arithmetic circuit 16 generates a difference signal $J = R - L$ between the first and second comparative signals R and L and outputs it to an arithmetic circuit 26. The arithmetic circuit 26 generates a shift signal Z indicating the direction in which the center of the oscillation is shifted from the weld line $W_0$ and the shift amount thereof, based on a function F(J), responsive to the difference signal J.

A position correction circuit 17 calculates a manipulated variable Q of the center C of the oscillation, responsive to the shift signal Z and outputs a signal indicating the manipulated variable Q to a driver 25. The driver 25 generates a correction signal $S_{17}$ for correcting the center of the oscillation, responsive to the signal indicating the manipulated variable Q, and outputs it to the positional controller 8.

Referring to FIG. 1, the composition of the arc welding apparatus will be described below, and the description of the circuits indicated by the same numerals as that shown in FIG. 2a is omitted therein.

A robot controller 2 comprises the position detecting circuit 11 and the positional controller 8. A controller 3 for enabling the welding torch WT to trace the weld line $W_0$ comprises the circuits 12 to 26 shown in FIG. 2a. A cumulative counter 21 is included in the position detecting circuit 11, the cumulative counter 21 counts an encoded signal indicating the position P of the oscillation and outputs the counting value to a CPU 23 comprising the circuits 12 to 17, 19 and 26. A main storage circuit 24 comprises the circuits 18 and 20 shown in FIG. 2a. The welding current detecting circuit 10 is composed of a Hall device 10a for detecting the welding current I, an amplifier 10b, a sampling and hold circuit 10c, and an analogue to digital converter (referred to as an A/D converter hereinafter) 10d.

The aforementioned arithmetic circuits 14 and 15 calculate in respective preferred embodiments as follows.

(a) First preferred embodiment

The arithmetic circuit 14 calculates the integrated value $\Sigma Rr$ (the first detecting signal) of the welding current detected when the welding torch WT moves in the right direction for the first time interval of the right half of the amplitude of the oscillation, responsive to the waveform signal $S_{13}$, and calculates the integrated value $\Sigma Rl$ (the second detecting signal) of the welding current detected when the welding torch WT moves in the left direction for the first time interval, responsive to the waveform signal $S_{13}$. Furthermore, the arithmetic circuit 14 calculates the ratio $\Sigma Rr / \Sigma Rl$ and outputs the first comparative signal having level of ratio $\Sigma Rr / \Sigma Rl$.

The arithmetic circuit 15 calculates the integrated value $\Sigma Ll$ (the third detecting signal) of the welding current detected when the welding torch WT moves in the left direction for the second time interval of the left half of the amplitude of the oscillation, responsive to the waveform signal $S_{13}$, and calculates the integrated value $\Sigma Lr$ (the fourth detecting signal) of the welding current detected when the welding torch WT moves in the right direction for the second time interval, responsive to the waveform signal $S_{13}$. Furthermore, the arithmetic circuit 15 calculates the ratio $\Sigma Ll/\Sigma Lr$ and outputs the second comparative signal $L_1$ having the level of the ratio $\Sigma Ll/\Sigma Lr$.

(b) Second preferred embodiment

The arithmetic circuit 14 generates the first and second detecting signals $\Sigma Rr$ and $\Sigma Rl$ in the manner similar to the first preferred embodiment, and calculates the difference $(\Sigma Rr - \Sigma Rl)$ between respective levels of the first and second detecting signals $\Sigma Rr$ and $\Sigma Rl$ and outputs the first comparative signal $R_2$ having the level of the difference $(\Sigma Rr - \Sigma Rl)$.

The arithmetic circuit 15 generates the third and fourth detecting signals $\Sigma Ll$ and $\Sigma Lr$ in the manner similar to the first preferred embodiment, and calculates the difference $(\Sigma Ll - \Sigma Lr)$ between respective levels of the third and fourth detecting signals $\Sigma Ll$ and $\Sigma Lr$ and outputs the second comparative signal $L_2$ having the level of the difference $(\Sigma Ll - \Sigma Lr)$.

(c) Third preferred embodiment

The arithmetic circuit 14 calculates the ratio $R_3 = Rr/Rl$ (the first comparative signal) of the welding current signal $Rr$ (the first detecting signal) detected when the welding torch WT is located at a middle position while it moves in the right direction for the first time interval of the right half of the amplitude of the oscillation, to the welding current signal $Rl$ (the second detecting signal) detected when the welding torch WT is located at a middle position while it moves in the left direction for the first time interval, responsive to the waveform signal $S_{13}$. Furthermore, the arithmetic circuit 14 calculates the ratio $Rr/Rl$ and outputs the first comparative signal $R_3$ having the level of the ratio $Rr/Rl$.

The arithmetic circuit 15 calculates the ratio $L_3 = Ll/Lr$ (the second comparative signal) of the welding current signal $Ll$ (the third detecting signal) detected when the welding torch WT is located at a middle position while it moves in the left direction for the second interval of the left half of the amplitude of the oscillation, to the welding current signal $Lr$ (the fourth detecting signal) detected when the welding torch WT is located at a middle position while it moves in the right direction for the second time interval, responsive to the waveform signal $S_{13}$, and outputs the second comparative signal $L_3$.

(d) Fourth preferred embodiment

The arithmetic circuit 14 generates the first and second detecting signals $Rr$ and $Rl$ in the manner similar to the third preferred embodiment, calculates the difference $(Rr - Rl)$ between respective levels of the first and second detecting signals $Rr$ and $Rl$, and outputs the first comparative signal $R_4$. The arithmetic circuit 15 generates the third and fourth detecting signals $Ll$ and $Lr$ in the manner similar to the third preferred embodiment, calculates the difference $(Ll - Lr)$ between respective levels of the third and fourth detecting signals $Ll$ and $Lr$, and outputs the second comparative signal $L_4$.

(e) Fifth preferred embodiment

In the fifth preferred embodiment, the point different from the first to fourth preferred embodiments is that respective polarities of the first and second comparative signals R and L are inverted at a high oscillation frequency of 7 to 10 Hz.

(f) Sixth preferred embodiment

The arithmetic circuit 14 calculates the ratio $Re/Cl$ of the welding current (the first detecting signal) detected when the welding torch WT is located at the right edge of the oscillation after it moves in the right direction, to the welding current $Cl$ (the second detecting signal) detected when the welding torch WT is located at the center C of the oscillation while it moves in the left direction, responsive to the waveform signal $S_{13}$, and outputs the first comparative signal $R_6$ having the level of the ratio $Re/Cl$.

The arithmetic circuit 15 calculates the ratio $Le/Cr$ of the welding current $Le$ (the third detecting signal) detected when the welding torch WT is located at the left edge of the oscillation while it moves in the left direction, to the welding current $Cr$ (the fourth detecting signal) detected when the welding torch WT is located at the center C of the oscillation while it moves in the right direction, responsive to the waveform signal $S_{13}$, and outputs the second comparative signal $L_6$ having the level of the ratio $Le/Cr$.

In order to improve the precision of calculating the aforementioned ratios, a signal having the level of the ratio $Re/Cr$ may be outputted as the first comparative signal $R_6$, and a signal having the level of the ratio $Le/Cl$ may be outputted as the second comparative signal $L_6$.

(g) Seventh preferred embodiment

The arithmetic circuit 14 generates the first and second detecting signals Re and Cl in the manner similar to the sixth preferred embodiment, calculates the difference $(Re - Cl)$ between respective levels of the first and second detecting signals Re and Cl, and outputs the first comparative signal $R_7$ having the level of the difference $(Re - Cl)$.

The arithmetic circuit 15 generates the third and fourth detecting signals Le and Cr in the manner similar to the sixth preferred embodiment, calculates the difference $(Le - Cr)$ between respective levels of the third and fourth detecting signals Le and Cr and outputs the second comparative signal $L_7$ having the level of the difference $(Le - Cr)$.

In order to improve the precision of calculating the aforementioned differences, a signal having the level of the difference $(Re - Cr)$ may be outputted as the first comparative signal $R_7$, and a signal having the level of the difference $(Le - Cl)$ may be outputted as the second comparative signal $L_7$.

(h) Other modifications

In the aforementioned preferred embodiments, the welding torch WT is oscillated in the right and left directions and is moved along the weld line $W_0$ based on a change in the welding current due to changes in the arc length and the wire extension. The control method for trace the weld line $W_0$ according to the preset invention is limited to the aforementioned preferred embodiments. For example, the welding torch WT is enabled to trace the weld line $W_0$ based on a change in an electric signal such as the average value of the welding current, a digital signal converted from the sampled welding current, a voltage or a current detected in an arc state or a short state of the short arc welding, a background voltage or a background current detected in a pulsed arc welding.

(2) Sampling action of the arc welding apparatus

The sampling action of the controller 3 shown in FIGS. 1 and 2a will be described below.

(a) Period upon sampling the position of the welding torch and the welding current A frequency Fs of a clock signal corresponding to a period upon sampling data of the welding current corresponding to respective positions P of the welding torch WT is set at a high frequency of 10 to 15 kHz in order to sample the data accurately so as to detect a minute change such as several msec. in the welding current in a short circuit state of the short arc welding or for a time interval between a timing when a pulse current flows and a timing when a background current flows in the MAG pulse arc welding having a relatively short arc length.

(b) Period upon correcting the center of the oscillation

When a period Td upon correcting the center of the oscillation becomes relatively short, the shift amount of the welding torch WT from the weld line $W_0$ can be controlled minutely, however, the period Td can not be set at a value smaller than the calculation time Tc for which the position of the center of the oscillation is corrected in one operation. On the contrary, when the period Td becomes selectively long, the number of the data to be processed upon correcting the position of the center of the oscillation in one operation can be increased since a longer calculation time for controlling the position of the center of the oscillation can be set, resulting in that the reliability of the control operation can be improved.

When the welding torch WT moves in the direction of the weld line $W_0$ by a movement distance Ld for the period Td, the period Td is set so that the movement distance Ld becomes substantially constant and the period Td becomes longer than the calculation time Tc. Namely, the period Td is set at a maximum one of the ratio Ld/Vd or the calculation time Tc.

(c) Storage of the position of the welding torch and the welding current detecting signal The position detecting signal $S_{11}$ and the welding current detecting signal $S_{10}$ are stored in the ring buffer memories 18a and 20a of the main storage circuit 24, respectively, wherein the next address of the last address of each of the memories 18a and 20a is the top address, and the address thereof at which either the signal $S_{11}$ or $S_{10}$ is stored or read out is indicated by the ring buffer pointer.

(d) Flowchart of the sampling process

Figure 3A:
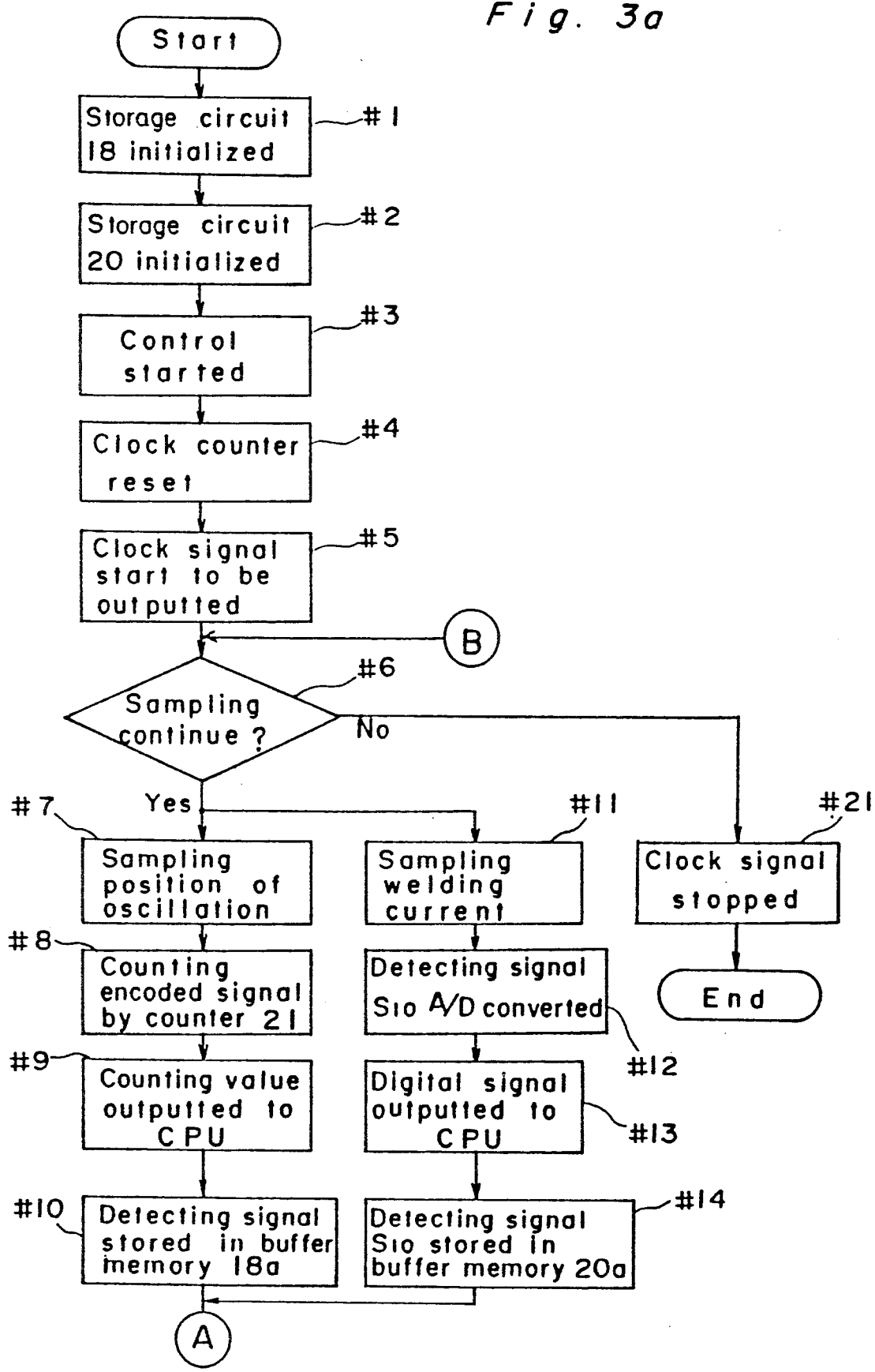
Figure 3B:
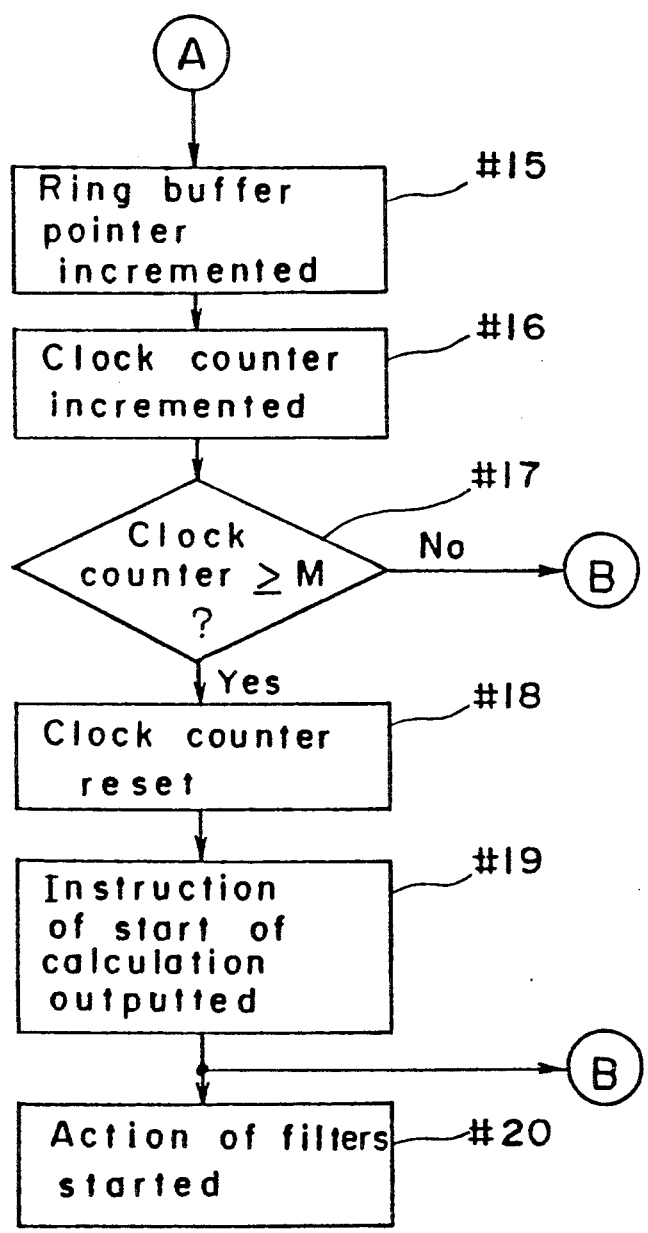

FIGS. 3a and 3b are flowcharts showing the sampling process for sampling the detecting signals $S_{11}$ and $S_{10}$ and storing the sampled signals in the ring buffer memories 18a and 20a, respectively.

Referring to FIG. 3a, first of all, when the power is supplied to the arc welding apparatus, the sampling process is started, and then, the storage circuits 18 and 20 are initialized at steps #1 and #2, respectively.

Thereafter, the process for controlling the position of the oscillating welding torch WT is started at step #3, a clock counter (not shown) for counting the clock signal used for sampling the detecting signal is reset, and the clock signal for sampling starts to be outputted at step #5. Then, it is judged whether or not the sampling action continues to be performed at step #6.

When the sampling process continues to be performed (Yes at step #6), the position of the oscillating welding torch WT is sampled at step #7, and the encoded signal outputted from an encoder of the position detecting circuit 11 is counted cumulatively by the cumulative counter 21 at step #8, and the counting value of the cumulative counter 21 is outputted as the detecting signal $S_{11}$ to the CPU 23 at step #9. Thereafter, a series of detecting signal $S_{11}$ shown in FIG. 4a which is input to the CPU 23 is stored at the address of the ring buffer memory 18a of the main storage circuit 24 indicated by a first ring buffer pointer at step #10.

Figure 5A:
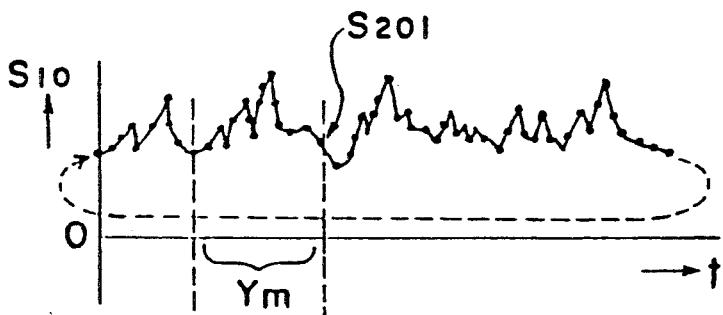
FIG. 5a is a waveform chart showing the relation between a series of signal $S_{10}$ to be stored in a ring buffer memory 20a and an elapsed time t.

On the other hand, after the welding current is sampled at step #11, the welding current detecting signal $S_{10}$ outputted from the welding current detecting circuit 10 is converted into a digital signal by the A/D converter 10d shown in FIG. 1 at step #12 and the converted digital signal is input to the CPU 23 at step #13, a series of welding current detecting signal $S_{10}$ shown in FIG. 5a which has been input to the CPU 23 is stored at the address of a second ring buffer memory 20a of the main storage circuit 24 indicated by the ring buffer pointer at step #14.

When a series of detecting signal $S_{11}$ has been stored in the ring buffer memory 18a and a series of welding current detecting signal $S_{10}$ has been stored in the ring buffer memory 20a, respective ring buffer pointers of the first and second ring buffer memories 18a and 20a are incremented at step #15, and the clock counter (not shown in FIGS. 2a and 1) is incremented by one. Then, the above sampling process at steps #6 to #16 is repeated until the counting value of the clock counter becomes a predetermined setting value M, wherein the setting value M is, for example, the product of the frequency Fs of the clock signal for sampling and the time period Td.

When the counting value of the clock counter becomes the setting value M (Yes at step #17), the clock counter is reset at step #18, and the instruction of start of the calculation is outputted at step #19. Then, the program flow goes to step #6, and the sampling process is repeated. On the other hand, after the instruction of start of the calculation is outputted at step #19, the action of the filters 12 and 19 is started.

When the sampling process does not continue to be performed (No at step #6), the clock signal for sampling stops to be outputted, and then, the process for controlling the position of the center C of the oscillation is completed.

(3) Action of Filters (a) Action of High pass filter 19

The action of the high pass filter 19 will be described below with reference to FIGS. 6a to 6d.

Figure 6A:
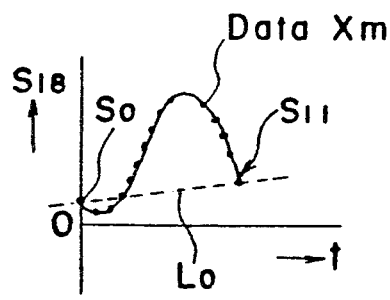
Figure 6B:
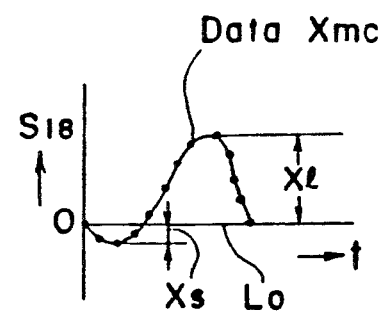

As shown in FIG. 6a, the first value $S_0$ of the data Xm read out from the buffer memory 18b and the latest value $S_{11}$ thereof are linked by a straight line $L_0$, and the data Xm are converted into data Xmc so that each value located on the straight line $L_0$ becomes zero, as shown in FIG. 6b.

Figure 6C:
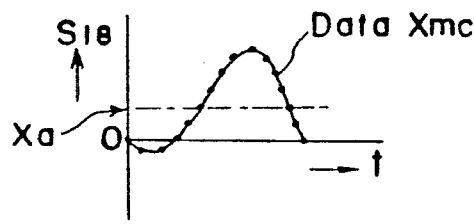
Figure 6D:
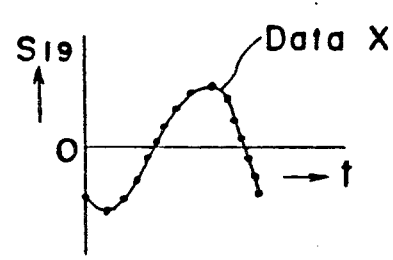

Thereafter, the converted data Xmc are further converted into the data X to be outputted to the waveform composing circuit 13 so that the average value Xa shown in FIG. 6c of the maximum value Xl of the data Xmc and the minimum value Xs thereof becomes zero corresponding to zero point of the oscillation, as shown in FIG. 6d.

(b) Action of Low pass filter 12

Figure 7:
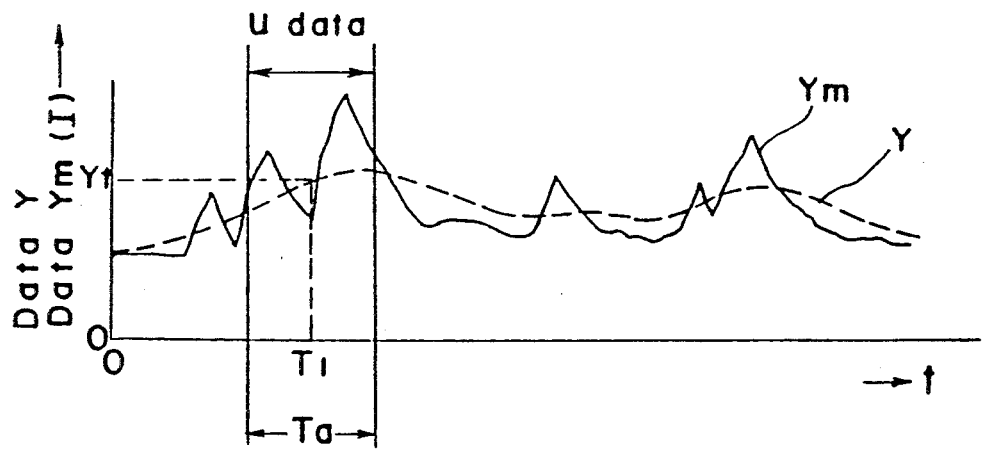
FIG. 7 is a waveform chart showing the relation between the data Y and Ym processed in a storage circuit 20 composed of the ring buffer memory 20a and the buffer memory 20b, and an elapsed time t.

The real line of FIG. 7 shows a series of signal $S_{20}$ (the data Ym) outputted from the ring buffer memory 20a to an elapsed time t. As shown in FIG. 7, there is calculated the average value Yt of the number n of data Ym for a predetermined time interval Ta such as 10 to 50 msec. required for converting the data Ym into the data Y so that respective values of the data Y vary smoothly, wherein the number u of the data Ym exist for the time interval Ta is the product of a predetermined smoothing time interval Ta and the frequency Fs of the clock signal for sampling. The moving average value Yt is represented by the following equation:

$$Yt = \left( \sum_{i=t-\frac{u}{2}}^{t+\frac{u}{2}-1} Ym_i \right) / u$$

For example, the value of the data Ym at a timing $T_1$ corresponding to a middle timing for the time interval Ta is converted into the moving average value Yt. A dotted line of FIG. 7 shows a change Y in the moving average value Yt as the time t proceeds.

In the preferred embodiments, as described above, the center of the oscillation of the welding torch Wt is controlled to be moved according to the moving average value Yt. Therefore, the welding torch WT can be controlled to be moved along the weld line WT so as to follow a change for a relatively short time such as the short circuit phenomenon produced in the short arc welding method.

It is to be noted that the frequency of the filtered oscillation position detection signal $S_{19}$ or data X which is outputted from the high pass filter 19 may be set at the same frequency in the range from 10 kHz to 15 kHz as the sampling frequency of the welding current. However, since there is little noise in the oscillation position detection signal $S_{19}$, the sampling frequency of the oscillation position detection signal $S_{19}$ can be set at a low frequency such as about 1 kHz in order to decrease the processing amount of the CPU 23 for processing this signal $S_{19}$. In this case, there is further calculated an average value of the number 10 or 15 of moving average values Yt of a series of current buffer signal $S_{20}$ or data Ym. Then, the frequency of the data Y can be decreased down to the frequency of the filtered oscillation position detection signal $S_{19}$ or the data X which is outputted from the high pass filter 19, and a waveform signal $S_{13}$ can be formed by the waveform composing circuit 13 responsive to the data X and Y.

In the preferred embodiments, the center of the oscillation of the welding torch WT is controlled to be moved according to the change Y in the moving average value Yt as the time t proceeds as shown in FIG. 7. Therefore, no phase delay and no energy loss are produced in the present preferred embodiments, as compared with the conventional analogue low pass filter having a phase delay and an energy loss. Accordingly, even in the short arc welding method, there can be obtained an output signal into which the heat input during the arc production and the heat input during the short circuit are converted accurately, and there can be obtained an equivalent wire extension length. As a result, there can be utilized the conventional arc sensor for detecting the welding current responsive to the change in the wire extension length in the spray arc welding method.

(4) Calculation of the position correction signal

Figure 4B:
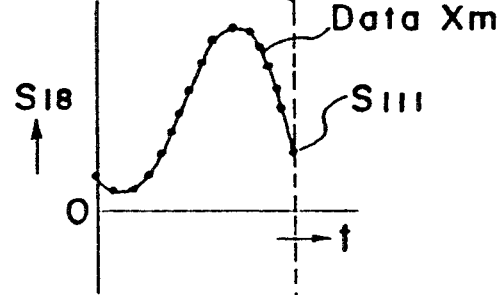
FIG. 4b is a waveform chart showing the relation between a series of signal $S_{18}$ (data Xm) to be stored in a buffer memory 18b shown in FIG. 2a and the elapsed time t.
Figure 4C:
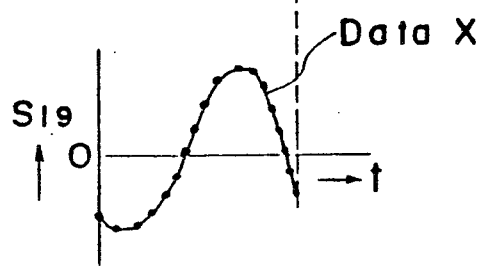
FIG. 4c is a waveform chart showing the relation between a series of signal $S_{19}$ (data X) outputted from a high pass filter 19 shown in FIG. 2a and the elapsed time t.
Figure 5B:
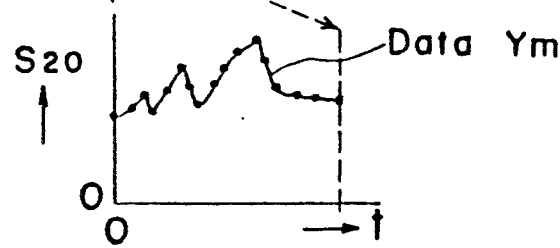
FIG. 5b is a waveform chart showing the relation between a series of signal $S_{20}$ (data Ym) to be stored in a buffer memory 20b and the elapsed time t.
Figure 5C:
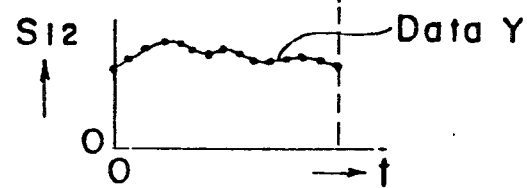
FIG. 5c is a waveform chart showing the relation between a series of signal $S_{12}$ (data Y) outputted from a low pass filter 12 and the elapsed time t.
Figure 8:
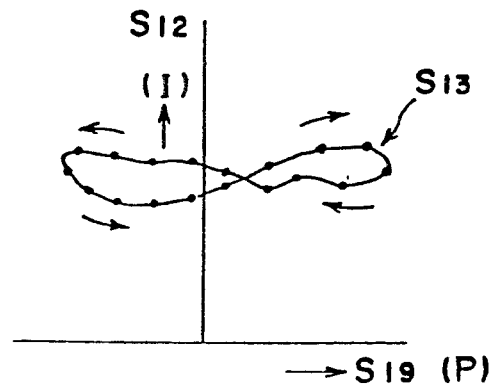
Figure 9A:
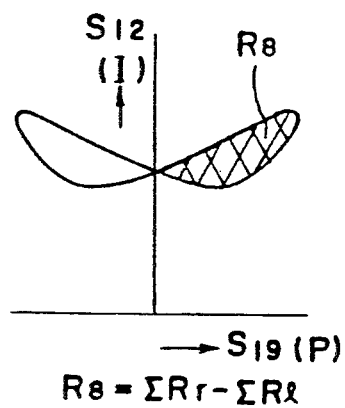
Figure 9B:
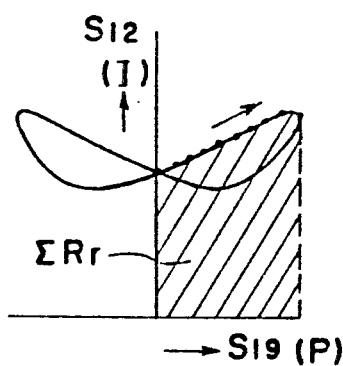
Figure 9C:
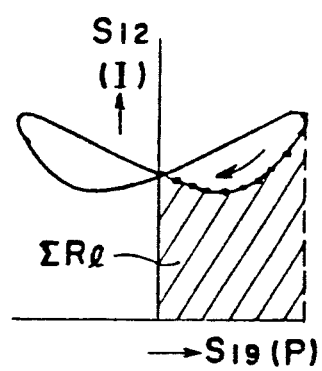
Figure 10A:
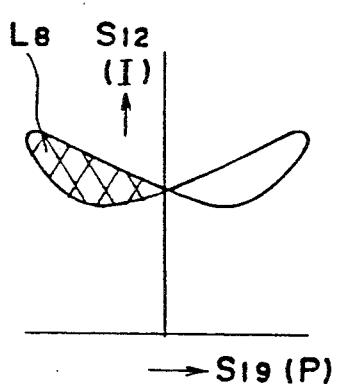
Figure 10B:
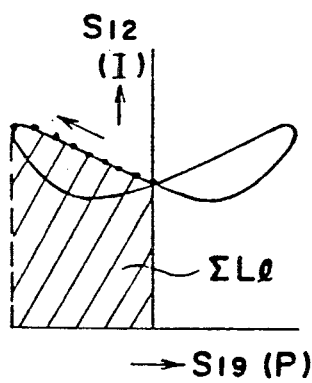
Figure 10C:
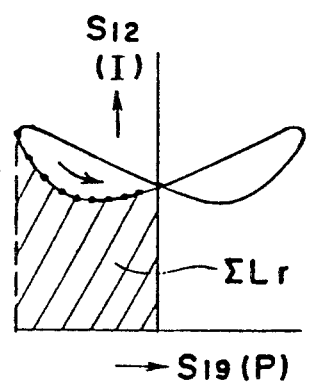

A series of signal $S_{19}$ (the data X) shown in (C) of FIG. 4 which is outputted from the high pass filter 19 and a series of signal $S_{12}$ (the data Y) shown in (C) in FIG. 5 which is outputted from the low pass filter 12 are input to the waveform composing circuit 13, and the waveform composing circuit 13 generates the waveform signal $S_{13}$ shown in FIG. 8. Furthermore, responsive to the waveform signal $S_{13}$, the arithmetic circuit 16 calculates the sum $\Sigma Rr$ of the data of the welding current (shown in FIG. 9b) detected when the welding torch WT moves in the right direction for the time interval of the right half of the amplitude of the oscillation, and calculates the sum $\Sigma Rl$ of the data of the welding current (shown in FIG. 9c) detected when the welding torch WT moves in the left direction for the time interval of the right half of the amplitude of the oscillation. Thereafter, the arithmetic circuit 16 calculates the difference $\Sigma Rr - \Sigma Rl$ and outputs the first comparative signal $R_8$ having the level of the difference $\Sigma Rr - \Sigma Rl$ (See FIG. 9a).

In FIGS. 9a to 9c and 10a to 10c, the axis of abscissa represents the signal $S_{19}$ outputted from the high pass filter 19 corresponding to the position P of the oscillating welding torch WT, and the axis of ordinate represents the signal $S_{12}$ outputted from the low pass filter 12 corresponding to the welding current I.

Responsive to the waveform signal $S_{13}$, the arithmetic circuit 15 calculates the sum $\Sigma Ll$ of the data of the welding current (shown in FIG. 10b) detected when the welding torch WT moves in the left direction for the time interval of the left half of the amplitude of the oscillation, and calculates the sum $\Sigma Lr$ of the data of the welding current (shown in FIG. 10c) detected when the welding torch WT moves in the right direction for the time interval of the left half of the amplitude of the oscillation. Furthermore, the arithmetic circuit 15 calculates the difference $\Sigma Ll - \Sigma Lr$ between the sums $\Sigma Ll$ and $\Sigma Lr$, and outputs the second comparative signal $L_8$ having the level of the difference $\Sigma Ll - \Sigma Lr$ (See FIG. 10a).

The arithmetic circuit 16 calculates the difference $R_8 - L_8$ between the first and second comparative signals $R_8$ and $L_8$, and outputs the difference signal J having the level of the difference $R_8 - L_8$. The arithmetic circuit 26 calculates a value of the function F(J) having a variable of the difference signal J, and outputs the signal Z corresponding to the value of the function F(J). For example, the function F(J) is represented by the following equation:

$$F(J) = a_0 \cdot J + b_0,$$

wherein $a_0$ and $b_0$ are predetermined constants, respectively.

For example, when the oscillation frequency is 5 [Hz], $a > 0$ since the locus of the waveform signal $S_{13}$ rotates in the aforementioned normal rotation direction in a form of a character of the symbol of infinity ∞. On the other hand, when the oscillation frequency is 10 [Hz], a<0 since the locus thereof rotates in the aforementioned reverse rotation direction in a waveform of a character of 8 which is rotated by right angle. Namely, the center of the welding torch WT is controlled to be moved in such a direction that the level of the difference signal J decreases.

Figure 11A:
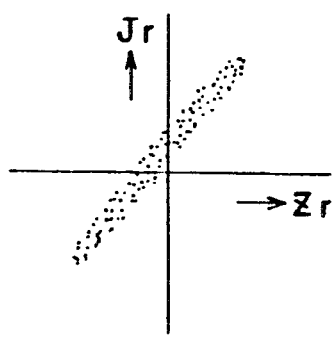
FIGS. 11a and 11b are charts showing the relation between a shift amount Z by which the wire end Wa is previously shifted from the weld line $W_0$ and the difference calculated by the arithmetic circuit 16.
Figure 11B:
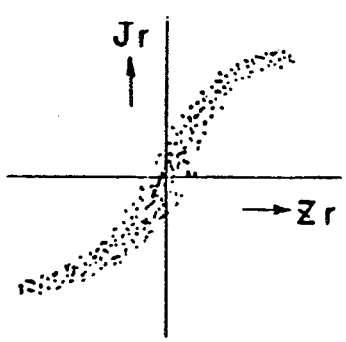

The welding operation is performed after the wire end Wa is shifted by a predetermined distance Zr from the weld line $W_0$ previously, and then, constitutional diagrams shown in FIGS. 11a and 11b are obtained depending upon a form of the groove and the position of the welding torch WT by calculating the aforementioned signal Jr. For example, as shown in FIG. 11a, since the signal Jr is approximately proportional to the shift amount Zr, the relationship between the signal Jr and the shift amount Zr is represented by the following equation.

$$Zr = a_0 \cdot Jr + b_0$$

After the values of $a_0$ and $b_0$ are calculated by the regression analysis, the shift amount Z by which the center C of the oscillation is to be shifted can be obtained based on the aforementioned signal J.

The position correction circuit 17 calculates the manipulated variable Q of the center C of the oscillation, responsive to the signal Z outputted from the arithmetic circuit 26. For example, in the PID control process, the manipulated variable $Q_i$ is represented by the following equation:

$$Q_i = kZ_i + l \sum_{j=0}^{i} Z_j + m(z_i - z_{i-1}),$$

wherein k, l and m are predetermined constants, respectively, and i is the number of times of the calculation upon controlling the position of the center C of the oscillation.

Responsive to the manipulated variable Q, the driver 25 generates the center position correcting signal $S_{17}$ corresponding to the manipulated variable Q and outputs it to the positional controller 8 so as to correct the position of the center of the oscillation upon moving the welding torch WT along the weld line $W_0$.

(5) Effect of the preferred embodiments

The effect of the preset preferred embodiments will be described below.

(a)

The welding torch WT is enabled to trace the weld line $W_0$ at an oscillation frequency higher than that of a conventional control process.

Figure 12:
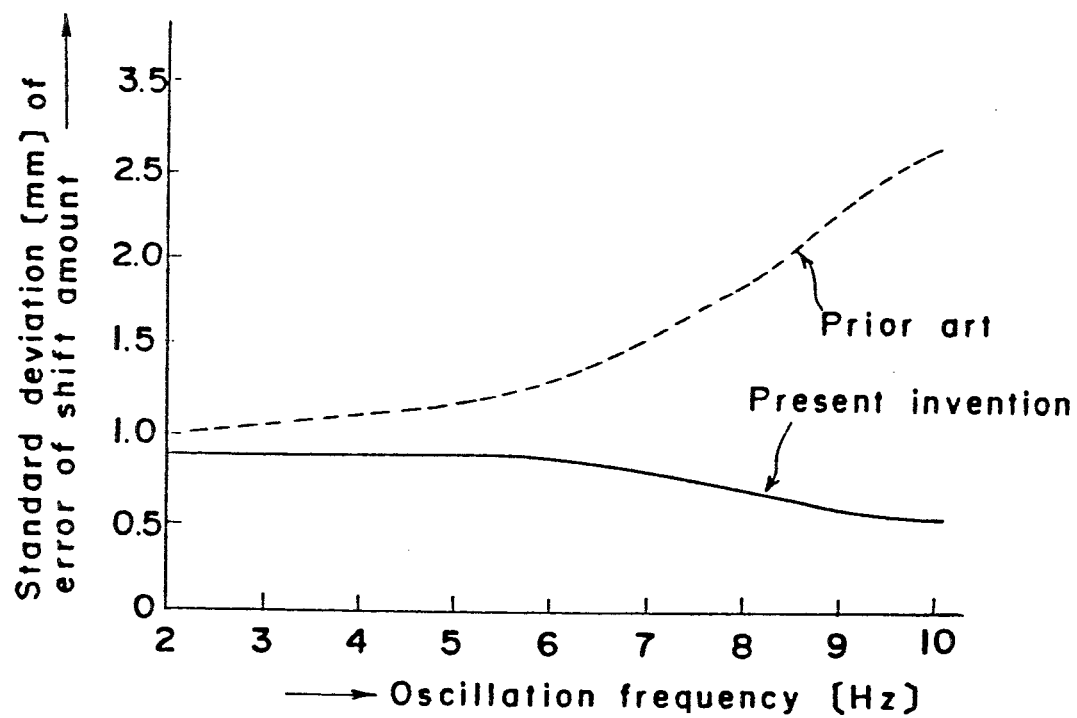
FIG. 12 is a graph showing the relation between a standard deviation of an error of a shift amount [mms] and an oscillation frequency [Hz]

FIG. 12 is a graph showing the relationship between an oscillation frequency ]Hz] represented by the axis of abscissa and a standard deviation [mms] of an error of a shift amount represented by the axis of ordinate when the shift amount by which the center C of the oscillation is shifted from the weld line $W_0$ is detected, wherein a dotted line of FIG. 12 shows the standard deviation thereof in the conventional control process, and a real line of FIG. 12 shows the standard deviation thereof in the control method of the preset preferred embodiments.

Referring to FIG. 12, in the conventional control process, the weld line $W_0$ can be detected only up to a middle oscillation frequency of about 5 Hz, namely, when the oscillation frequency is equal to or higher than 6 Hz, the welding operation can not be performed satisfactorily since the standard deviation thereof is extremely larger than 1 [mm]. On the other hand, in the control process of the present preferred embodiment, the standard deviation thereof is smaller than 1.0 [mm] at an oscillation frequency in the range from 2 to 6 Hz, and the standard deviation thereof decreases according to the oscillation frequency contrary to that of the present preferred embodiment when the oscillation frequency is higher than 6 Hz. When the oscillation frequency is 10 Hz, the standard deviation is 0.5 [mm], and particularly at a high oscillation frequency, the error of the shift amount becomes small.

In the conventional control process, when only a welding speed at which the welding torch WT is moved along the weld line $W_0$ is increased without heightening the oscillation frequency, the welding bead is formed thereon with meandering. In the conventional control process, the maximum welding speed upon moving the welding torch WT along the weld line $W_0$ is about 120 [cms/min.] in the case of a vertical down fillet welding, and the maximum welding speed is about 80 [cms/min.] in the case of a lap fillet welding. On the other hand, in the present preferred embodiments, a high oscillation frequency can be set so as to fall in the range from 7 to 10 Hz. Therefore, the maximum welding speed upon moving the welding torch WT along the weld line $W_0$ is about 200 [cms/min.] in the case of the vertical down fillet welding, and the maximum welding speed is about 150 [cms/min.] in the case of the lap fillet welding. Namely, when the welding speed is set at twice the welding speed set in the conventional control process, the oscillation frequency can be set at twice the oscillation frequency in the conventional control process, and the welding bead can be formed without meandering.

Furthermore, in the conventional control process, the welding speed can not be increased even when thin plates are welded since there is an upper limit in the maximum welding speed upon moving the welding torch WT along the weld line. Therefore, the minimum thickness of the plates which can be welded together is 2.0 [mms] in the case of the horizontal fillet welding, and the minimum thickness thereof is 3.2 [mms] in the case of the lap fillet welding. On the other hand, in the present preferred embodiments, the minimum thickness thereof is 1.2 [mms] in the case of the horizontal fillet welding, and the minimum thickness thereof is 2.3 [mms] in the case of the lap fillet welding.

(b)

The precision of moving the welding torch along the weld line is improved.

An arc sensor used in the conventional control process can detect the shift amount by which the center C of the oscillation is shifted from the weld line $W_0$ based on the data of respective average values of the welding current detected for one period or half the period of the oscillation. However, when the oscillation frequency is heightened, a sampling number in which the welding current can be sampled for a unit time interval increases.

Figure 13:
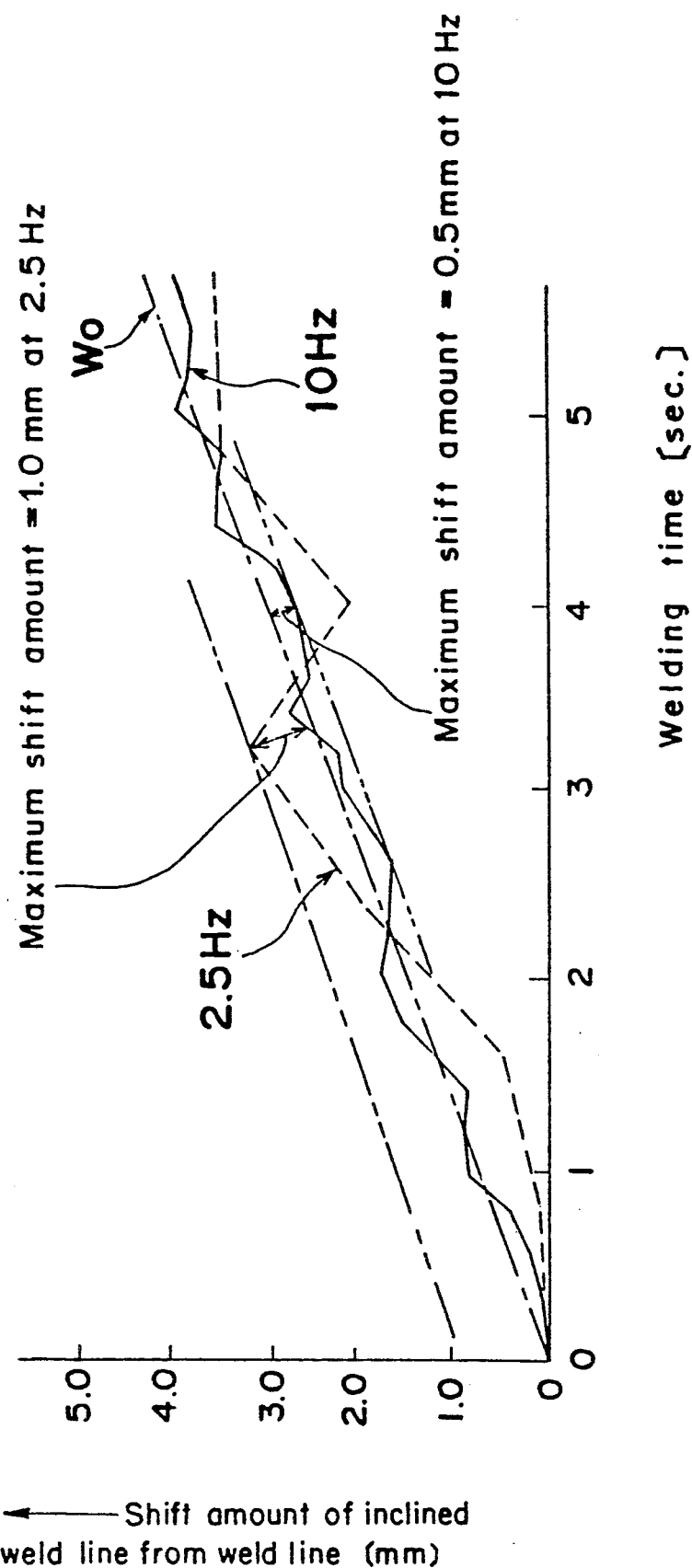
FIG. 13 is a graph showing the relation between a shift amount of an inclined weld line from a preset weld line and a welding time.

FIG. 13 is a graph showing the shift of a real weld line Ws inclined from a predetermined weld line corresponding to the axis of abscissa, wherein the axis of abscissa thereof represents a welding time [sec.] and the axis of ordinate represents the shift amount [mms] of the position of the real weld line inclined from the predetermined weld line. A dotted line of FIG. 13 shows characteristic of the shift amount [mms] of the center C of the oscillation from the inclined real weld line Ws to a passed time [sec.] at an oscillation frequency of 2.5 Hz in the conventional control process. As shown in the dotted line of FIG. 13, a maximum shift amount of 1.0 [mm] is caused. On the other hand, a real line of FIG. 13 shows characteristic of the shift amount [mms] of the center C of the oscillation from the inclined real weld line Ws to a passed time [sec.] at an oscillation frequency of 10 Hz in the present preferred embodiments. As shown in the real line of FIG. 13, a maximum shift amount is equal to smaller than 0.5 [mms], namely, it becomes equal to or smaller than half the maximum shift amount in the conventional control process and the precision of moving the welding torch WT along the weld line is improved.

(c)

The position of the oscillating welding torch can be controlled so as to trace the weld line in the case of a vertical down welding.

In the vertical down welding, the melting metal drops under the arc and flows onto the surface of the groove unstably. Therefore, it is remarkably difficult to perform the vertical down welding using the conventional control process with the arc sensor. On the other hand, in the control process of the present preferred embodiments, a higher oscillation frequency can be set and a higher welding speed can be set than that in the conventional control process. Therefore, the welding torch WT or the arc can be moved at a welding speed higher than the speed at which the melting metal drops, resulting in that the welding torch WT can be controlled to be moved along the weld line $W_0$ more stably in the vertical down welding without the influence of dropping of the melting metal. For example, the vertical down fillet welding can be performed at a welding speed of 200 [cms/min.] and the lap vertical fillet welding is performed at a welding speed of 150 [cms/min.].

(d)

The position of the oscillating welding torch can be controlled precisely so as to trace the weld line even in the case of a small welding current.

In the conventional control process with the arc sensor, when the welding current decreases, the error of detecting the welding current increases. However, in the control process of the present preferred embodiments, the error of detecting the welding current can be decreased as compared with that in the conventional control process by setting a high oscillation frequency. Therefore, the control process of the present preferred embodiments can be used even in the case of a welding current smaller than that in the conventional control process.

(e)

The control process of the present preferred embodiments can be applied to various kinds of welding processes.

The conventional control process is performed under the condition that the arc length is kept approximately constant. Therefore, the conventional control process can not be used in common with welding processes having different inductances of the power source for welding.

On the other hand, even though the arc length varies for a short time or the inductance of the power source for welding varies, the control method of the present preferred embodiments according to the present invention can be applied to various kinds of welding processes solely or commonly over the wide range of the welding condition, such as the spray arc welding method, the short arc welding method, the MAG pulse arc welding method having a relatively short arc length. This is the largest feature or advantage of the present preferred embodiments.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A control apparatus for enabling a welding torch to trace a weld line in a welding apparatus while oscillating said welding torch in opposite left and right directions crossing said weld line with an overpass comprising:

position detection means for detecting a position of said welding torch and outputting a position detecting signal representative thereof;

first sampling means for sampling said position detecting signal with a predetermined first period and outputting a position digital signal representative thereof;

first storage means for sequentially storing said position digital signal;

first reading means for reading out a series of said position digital signals and outputting a position data signal comprised of a series of said position digital signals;

current detection means for detecting a welding current flowing between said welding torch and works to be welded responsive to changes in an arc length and a wire extension and outputting a current detecting signal representative thereof;

second sampling means for sampling said current detecting signal with a predetermined second period and outputting a current digital signal representative thereof;

second storage means for sequentially storing said current digital signal;

second reading means for sequentially reading out a series of said current digital signals;

calculation means for sequentially calculating a moving average value of said current data signal comprised of a series of said current digital signals for a predetermined smoothing time interval so as to eliminate a high frequency noise component of said current digital signal, and outputting a current data signal comprised of a series of the calculated moving average values;

composing means for composing both said position data signal outputted from said first reading means and said current data signal outputted from said calculation means, and outputting a waveform signal representing both said position data signal and said current data signal; and control means for moving the center of said oscillation to enable said welding torch to trace said weld line responsive to said waveform signal outputted from said composing means.

2. The apparatus as claimed in claim 1, wherein said control means comprises:

comparison means for outputting a comparison signal by comparing said waveform signal for a first time interval of the right half of the amplitude of said oscillation with said waveform signal for a second time interval of the left half of the amplitude of said oscillation; and moving means for moving the center of said oscillation in a direction to reduce said comparison signal to enable said welding torch to trace said weld line.

3. A control method for enabling a welding torch to trace a weld line in a welding apparatus while oscillating said welding torch in opposite left and right directions crossing said weld line with an overpass including:

position detection step of detecting a position of said welding torch and outputting a position detecting signal representative thereof;

first sampling step of sampling said position detecting signal with a predetermined first period and outputting a position digital signal representative thereof;

first storage step of sequentially storing said position digital signal;

first reading step of reading out a series of said position digital signals and outputting a position data signal comprised of a series of said position digital signals;

current detection step of detecting a welding current flowing between said welding torch and works to be welded responsive to changes in an arc length and a wire extension and outputting a current detecting signal representative thereof;

second sampling step of sampling said current detecting signal with a predetermined second period and outputting a current digital signal representative thereof;

second storage step of sequentially storing said current digital signal;

second reading step of sequentially reading out a series of said current digital signals;

calculation step of sequentially calculating a moving average value of said current data signal comprised of a series of said current digital signals for a predetermined smoothing time interval to eliminate a high frequency noise component of said current digital signal, and outputting a current data signal comprised of a series of the calculated moving average values;

composing step of composing both said position data signal and said current data signal, and outputting a waveform signal representing both said position data signal and said current data signal; and control step of moving the center of said oscillation to enable said welding torch to trace said weld line responsive to said wave form signal.

4. The method as claimed in claim 3, wherein said control step includes the steps of:

outputting a comparison signal by comparing said waveform signal for a first time interval of the right half of the amplitude of said oscillation with said waveform signal for a second time interval of the left half of the amplitude of said oscillation; and moving the center of said oscillation in a direction to reduce said comparison signal to enable said welding torch to trace said weld line.

5. The method as claimed in claim 3, wherein said control step includes the steps of:

detecting said waveform signal as a first detecting signal when said welding torch moves in the right direction for a first time interval of the right half of the amplitude of the oscillation;

detecting said waveform signal as a second detecting signal when said welding torch moves in the left direction for the first time interval;

generating a first comparative signal by comparing the first detecting signal with the second detecting signal;

detecting said waveform signal as a third detecting signal when said welding torch moves in the left direction for a second time interval of the left half of the amplitude of the oscillation;

detecting said waveform signal as a fourth detecting signal when said welding torch moves in the right direction for the second time interval;

generating a second comparative signal by comparing the third detecting signal with the fourth detecting signal;

calculating a difference between respective levels of the first and second comparative signals; and moving the center of the oscillation in a direction to reduce the calculated difference to enable said welding torch to trace said weld line.

6. The method as claimed in claim 5, wherein the first to fourth detecting signals have levels of integrated values of a welding current flowing between said welding torch and said works to be welded;

calculating a ratio of the first detecting signal to the second detecting signal to generate the first comparative signal having the level of the calculated ration; and calculating a ratio of the third detecting signal to the fourth detecting signal to generate the second comparative signal having the level of the calculated ratio.

7. The method as claimed in claim 5, wherein the first to fourth detecting signals have levels of integrated values of a welding current flowing between said welding torch and said works to be welded;

calculating a difference between the first and second detecting signals to generate the first comparative signal having the level of the calculated difference; and calculating a difference between the third and fourth detecting signals to generate the second comparative signal having the level of the calculated difference.

8. The method as claimed in claim 5, wherein the first detecting signal has a level of a welding current flowing between said welding torch and said works to be welded when said welding torch is located at a predetermined first position;

the second detecting signal has a level of the welding current when said welding torch is located at the first position;

the third detecting signal has a level of the welding current when said welding torch is located at a predetermined second position;

the fourth detecting signal has a level of the welding current when said welding torch is located at the second position;

calculating a ratio of the first detecting signal to the second detecting signal to generate the first comparative signal having the level of the calculated ratio; and calculating a ratio of the third detecting signal to the fourth detecting signal to generate the second comparative signal having the level of the calculated ratio.

9. The method as claimed in claim 8, wherein the first position is a middle point of the right half of the amplitude of the oscillation, and the second position is a middle point of the left half thereof.

10. The method as claimed in claim 5, wherein the first detecting signal has a level of a welding current flowing between said welding torch and said works to be welded when said welding torch is located at a predetermined first position;

the second detecting signal has a level of the welding current when said welding torch is located at the first position;

the third detecting signal has a level of the welding current when said welding torch is located at a predetermined second position;

the fourth detecting signal has a level of the welding current when said welding torch is located at the second position;

calculating a difference between the first and second detecting signals to generate the first comparative signal having the level of the calculated difference; and calculating a difference between the third and fourth detecting signals to generate the second comparative signal having the level of the calculated difference.

11. The method as claimed in claim 10, wherein the first position is a middle point of the right half of the amplitude of the oscillation, and the second position is a middle point of the left hand thereof.

12. The method as claimed in claim 5, wherein the calculated difference used for determining the direction in which the center of the oscillation is moved is set so that the sign of the calculated difference at an oscillation frequency lower than a predetermined frequency is different from the sign of the calculated difference at the oscillation frequency equal to or higher than the predetermined frequency.

13. The method as claimed in claim 3, wherein said control step includes the steps of:

detecting said waveform signal as a first detecting signal when said welding torch is located at the right edge of the oscillation after said welding torch moves in the right direction;

detecting said waveform signal as a second detecting signal when said welding torch is located at the center of the oscillation while said welding torch moves in the left direction;

generating a first comparative signal by comparing the first detecting signal with the second detecting signal;

detecting said waveform signal as a third detecting signal when said welding torch is located at the left edge of the oscillation after said welding torch moves in the left direction;

detecting said waveform signal as a fourth detecting signal when said welding torch is located at the center of the oscillation while said welding torch moves in the right direction;

generating a second comparative signal by comparing the third detecting signal with the fourth detecting signal;

calculating a difference between respective levels of the first and second comparative signals; and moving the center of the oscillation in a direction to reduce the calculated difference to enable said welding torch to trace said weld line.

14. The method as claimed in claim 13, wherein the first to fourth detecting signals have levels of a welding current flowing between said welding torch and said works to be welded;

calculating a ratio of the first detecting signal to the second detecting signal to generate the first comparative signal having the level of the calculated ratio; and calculating a ratio of the third detecting signal to the fourth detecting signal to generate the second comparative signal having the level of the calculated ratio.

15. The method as claimed in claim 13, wherein the first to fourth detecting signals have levels of a welding current flowing between said welding torch and said works to be welded, and a generation method for generating the first and second comparative signal is switched over as follows:

when an oscillation frequency is lower than a predetermined frequency, calculating a ratio of the first detecting signal to the second detecting signal to generate the first comparative signal having the level of the calculated ration, and calculating a ratio of the third detecting signal to the fourth detecting signal to generate the second comparative signal having the level of the calculated ratio, when the oscillation frequency is equal to or higher than the predetermined frequency, calculating a ratio of the first detecting signal to the fourth detecting signal to generate the first comparative signal having the level of the calculated ratio, and calculating a ratio of the third detecting signal to the second detecting signal to generate the second comparative signal having the level of the calculated ratio.

16. The method as claimed in claim 13, wherein the first to fourth detecting signals have levels of a welding current flowing between said welding torch and said works to be welded;

calculating a difference between the first detecting signal and the second detecting signal to generate the first comparative signal having the level of the calculated ratio; and calculating a difference between the third detecting signal and the fourth detecting signal to generate the second comparative signal having the level of the calculated ratio.

17. The method as claimed in claim 13, wherein the first to fourth detecting signals have levels of a welding current flowing between said welding torch and said works to be welded, and a generation method for generating the first and second comparative signals is switched over as follows:

when an oscillation frequency is lower than a predetermined frequency, calculating a difference between the first detecting signal and the second detecting signal to generate the first comparative signal having the level of the calculated ratio, and calculating a difference between the third detecting signal and the fourth detecting signal to generate the second comparative signal having the level of the calculated ratio, when the oscillation frequency is equal to or higher than the predetermined frequency, calculating a difference between the first detecting signal and the fourth detecting signal to generate the first comparative signal having the level of the calculated ratio, and calculating a difference between the third detecting signal and the second detecting signal to generate the second comparative signal having the level of the calculated ratio.

* * * * *

UNITED STATES PATENT AND TRADEMARK OFFICE
CERTIFICATE OF CORRECTION

PATENT NO. : 5,130,514
DATED : July 14, 1992
INVENTOR(S) : Katsuya Kugai, et al.

It is certified that error appears in the above-identified patent and that said Letters Patent is hereby corrected as shown below:

```
        Column 12, line 13:   "in Fig." should read as
--of Fig.--
        Column 13, line 57:   "]Hz]" should read as
--[Hz]--
        Column 14, line 13:   "[mm]" should read as
--[mms]--
        Column 18, line 41, Claim 6:  "ration" should
read as --ratio--
        Column 20, line 33, Claim 15: "ration" should
read as --ratio--
```

Signed and Sealed this

Fifth Day of October, 1993

Attest:

BRUCE LEHMAN

*Attesting Officer*     *Commissioner of Patents and Trademarks*